US011143241B2

(12) United States Patent
Wu

(10) Patent No.: US 11,143,241 B2
(45) Date of Patent: Oct. 12, 2021

(54) END COVER FOR VEHICLE NON-DRIVEN WHEEL HUB ASSEMBLY

(71) Applicant: Aktiebolaget SKF, Gothenburg (SE)

(72) Inventor: Zhengjiang Wu, Shanghai (CN)

(73) Assignee: AKTIEBOLAGET SKF

( * ) Notice: Subject to any disclaimer, the term of this patent is extended or adjusted under 35 U.S.C. 154(b) by 550 days.

(21) Appl. No.: 16/057,873

(22) Filed: Aug. 8, 2018

(65) Prior Publication Data
US 2019/0160863 A1    May 30, 2019

(30) Foreign Application Priority Data

Nov. 29, 2017   (CN) .......................... 201711230013.8

(51) Int. Cl.
*F16C 33/72*   (2006.01)
*F16C 33/76*   (2006.01)
(Continued)

(52) U.S. Cl.
CPC ............ *F16C 33/723* (2013.01); *F16C 33/76* (2013.01); *B60B 7/0013* (2013.01); *B60B 7/12* (2013.01); *B60B 27/0005* (2013.01); *B60B 27/0073* (2013.01); *B60B 27/02* (2013.01); *B60B 2360/102* (2013.01); *B60B 2360/32* (2013.01); *B60B 2900/211* (2013.01); *F16C 19/186* (2013.01); *F16C 2202/08* (2013.01); *F16C 2204/60* (2013.01); *F16C 2208/00* (2013.01); *F16C 2208/60* (2013.01); *F16C 2326/02* (2013.01)

(58) Field of Classification Search
CPC ...... F16C 19/186; F16C 33/723; F16C 33/76; F16C 2202/08; F16C 2204/60; F16C 2208/00; F16C 2208/60; F16C 2326/02; B60B 7/0013; B60B 7/12; B60B 27/0005; B60B 27/0073; B60B 27/02; B60B 2360/102; B60B 2360/32; B60B 2900/211
USPC ................................ 384/477, 489, 544, 569
See application file for complete search history.

(56) References Cited

U.S. PATENT DOCUMENTS

| 8,534,922 B2* | 9/2013 | Takada | F16C 33/723 |
| | | | 384/489 |
| 8,690,449 B2* | 4/2014 | Seki | B60B 27/0068 |
| | | | 384/544 |
| 10,294,994 B2* | 5/2019 | Sato | B32B 15/18 |

FOREIGN PATENT DOCUMENTS

| CN | 110271367 A | * | 9/2019 | |
| DE | 69733796 T2 | * | 6/2006 | G01P 3/488 |

(Continued)

*Primary Examiner* — Marcus Charles
(74) *Attorney, Agent, or Firm* — Reed Smith LLP

(57) ABSTRACT

An end cover for enclosing and protecting a vehicle non-driven wheel hub assembly from a vehicle body inner side. The hub assembly includes an outer ring, an inner ring, and two rows of rolling bodies disposed therebetween. The outer and inner rings define an interior space of the hub assembly in a radial direction. An end of the outer ring facing the vehicle body inner side forms a spigot for connection purposes. The end cover is formed having a pressure fitting part tightly fitted to the spigot from a radial direction, and a radial main body part capable of closing the interior space of the hub assembly from an axial direction. The pressure fitting and the radial main body parts form an elastic retainer. The end cover is largely made of a plastic material, and an at least partially contained metal framework is formed in the elastic retaining region.

10 Claims, 4 Drawing Sheets

(51) Int. Cl.
*F16C 19/18* (2006.01)
*B60B 7/00* (2006.01)
*B60B 7/12* (2006.01)
*B60B 27/00* (2006.01)
*B60B 27/02* (2006.01)

(56) References Cited

FOREIGN PATENT DOCUMENTS

| | | | | |
|---|---|---|---|---|
| DE | 102014205055 A1 | * | 9/2015 | ............ F16C 33/723 |
| EP | 1801437 B1 | * | 8/2011 | ............ F16C 33/723 |
| JP | 2004052832 A | * | 2/2004 | ........... B60B 7/0013 |
| JP | 2017009018 A | * | 1/2017 | ............ F16C 33/723 |
| WO | WO-2004081401 A1 | * | 9/2004 | ............ F16C 33/783 |
| WO | WO-2006054640 A1 | * | 5/2006 | ............. B60B 7/061 |
| WO | WO-2016059108 A1 | * | 4/2016 | ............... F16C 33/20 |
| WO | WO-2017082329 A1 | * | 5/2017 | ............. B29C 45/26 |

* cited by examiner

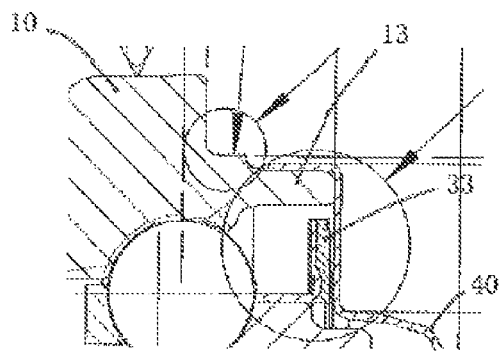
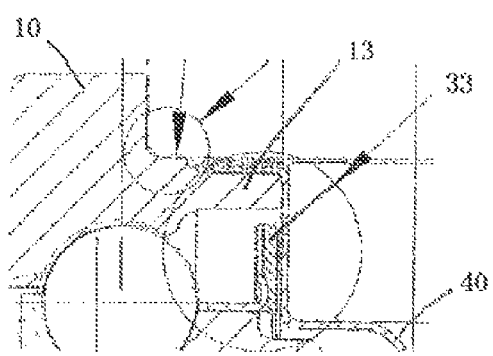
FIG. 2A  FIG. 2B
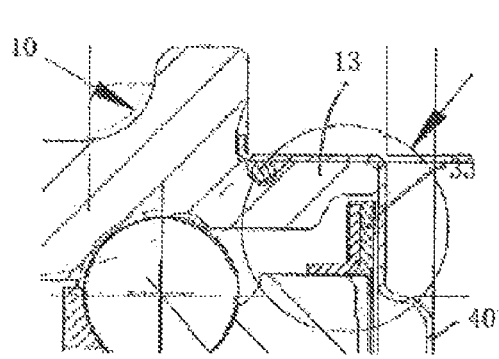
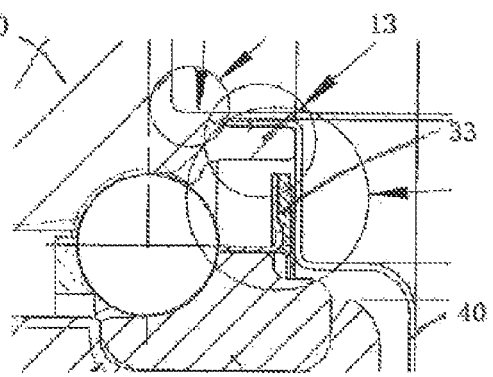
FIG. 2C  FIG. 2D
*PRIOR ART*
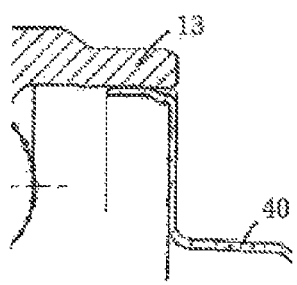
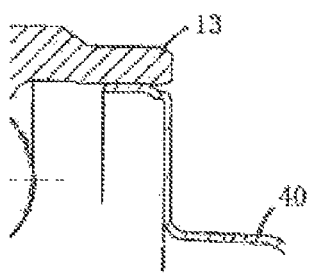
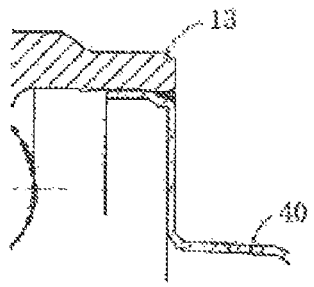
FIG. 3A  FIG. 3B  FIG. 3C
*PRIOR ART*

END COVER FOR VEHICLE NON-DRIVEN WHEEL HUB ASSEMBLY

CROSS-REFERENCE

This application claims priority to Chinese patent application no. 201711230013.8 filed on Nov. 29, 2017, the contents of which are fully incorporated herein by reference.

TECHNOLOGICAL FIELD

The present invention relates to an end cover for a vehicle non-driven wheel hub assembly, and a vehicle non-driven wheel hub assembly using the end cover.

BACKGROUND

Vehicle hub assemblies, also called hub bearing units, are categorized as driven wheel hub assemblies and non-driven wheel hub assemblies. In the schematic sectional view of an existing non-driven wheel hub assembly shown in FIG. 1, the hub assembly 100 mainly consists of an outer ring 10, an inner ring 20, and two rows of rolling elements 31 disposed between the inner ring and the outer ring. The outer ring 10 and inner ring 20 define an interior space 30 of the hub assembly 100 in a radial direction. An outer ring flange 11 is provided on the outer ring 10, with a bolt hole 12 disposed in the flange; a fixed connection with a vehicle body inner side (located on the right side in the figure) is achieved by means of a bolt (not shown), so the outer ring 10 is also called a flange outer ring. Similarly, an inner ring flange 21 is provided on the inner ring 20, with a bolt hole 22 disposed in the flange; a fixed connection with a wheel (located on an outer side of the vehicle body) is achieved by means of a bolt, so the inner ring 20 is also called a flange inner ring. When the vehicle is running, the outer ring 10 is a fixed ring, and the inner ring 20 rotates with the wheel. A magnetic wheel (magnetic impulse ring) 33 is disposed on the inner ring 20, at an edge thereof facing the vehicle body side. The magnetic wheel is made of a magnetic rubber material, and can supply an alternating magnetic field signal for a wheel end sensor (not shown) disposed on the vehicle body side, and thereby supply real-time state monitoring/control data for a state of motion of the wheel.

In the case of a non-driven wheel, the hub assembly is not provided with an axle connected thereto on the vehicle body inner side. Thus, in order to prevent foreign matter such as water and mud/grit from entering the interior space 30 of the hub, there is a need to provide a protective end cover 40 on the vehicle body inner side of the hub unit. In existing products, the end cover 40 is generally made of a non-magnetic metal material, such as austenitic stainless steel, in order to avoid affecting the transmission of magnetic field signals between the magnetic wheel and the wheel end sensor. The end cover 40 is fitted hermetically by a tight fit (interference fit) to a spigot 13 formed on an axial extremity of the outer ring 10. To improve the sealing result, in existing products, working on the basis of the solution shown in FIG. 2A, there is no option but to attach rubber to a surface of the end cover 40 in contact with the spigot 13, or to provide an O-ring between the end cover 40 and the spigot 13, as shown in FIGS. 2B and 2C, or to apply glue between the end cover 40 and the spigot 13 as shown in FIG. 2D, to completely block the ingress of water and foreign matter into the interior of the hub bearing by sealing or bonding measures.

In existing products, the end cover 40 can not only be fitted to the spigot 13 from a radially outer side as shown in FIG. 2 (abbreviated hereinbelow as "external fitting"), but can also be fitted to the spigot 13 from a radially inner side as shown in FIGS. 3A, 3B, and 3C (abbreviated hereinbelow as "internal fitting"). Up till now, both types of connection between the end cover 40 and the spigot 13, i.e. by internal fitting or external fitting, have been very common on the market.

Technologically speaking, sealing and protection can indeed be achieved through the use of a metal end cover with a sealing material (such as rubber or glue) attached; however, material costs and inconvenience in fitting arising therefrom have both resulted in product costs remaining at a high level. The market is calling out for a low-cost hub protective end cover that is convenient to install.

BRIEF SUMMARY OF THE PRESENT INVENTION

To solve the abovementioned technical problems, the present invention provides an end cover for providing sealing and protection for a non-driven wheel hub assembly of a vehicle from a vehicle body inner side. The hub assembly comprises an outer ring, an inner ring, and two rows of rolling bodies disposed between the outer ring and the inner ring. The outer ring and the inner ring define an interior space of the hub assembly in a radial direction. The outer ring, at an end thereof facing the vehicle body side, extends to form a spigot for connection purposes. The end cover is formed to have a pressure fitting part capable of being hermetically fitted to the spigot from a radially inner side or outer side, and a radial main body part capable of closing the interior space of the hub assembly from an axial direction. The pressure fitting part and the radial main body part form an elastic retaining region at a junction therebetween. The end cover is largely made of a plastic material, and a completely or partially contained metal framework is formed at least in the elastic retaining region.

The end cover employing the technical solution of a contained metal framework covered in plastic is not only able to reduce the end cover production cost, increasing the convenience of installation, but at the same time ensures that the sealing performance of the hub assembly can attain a satisfactory level. Compared with existing products, the present invention has huge technical advantages and broad application prospects.

Various embodiments and beneficial effects of the present invention are described in detail below with reference to the accompanying drawings.

BRIEF DESCRIPTION OF THE DRAWINGS

FIG. 2A presents a schematic sectional view of a metal end cover matched to a hub assembly outer ring spigot from a radially outer side, as used in an existing vehicle;

FIG. 2B presents a schematic sectional view of a metal end cover, with rubber attached, matched to an outer ring spigot from a radially outer side, as used in an existing vehicle;

FIG. 2C presents a schematic sectional view of a metal end cover matched to an outer ring spigot from a radially outer side, with an O-ring used in a fitting region to improve the sealing result, as used in an existing vehicle;

FIG. 2D presents a schematic sectional view of a metal end cover matched to an outer ring spigot from a radially outer side, with glue used in a fitting region to improve the sealing result, as used in an existing vehicle;

FIG. 3A presents a schematic sectional view of a metal end cover, with rubber attached, matched to an outer ring spigot from a radially inner side, as used in an existing vehicle;

FIG. 3B presents a schematic sectional view of a metal end cover matched to a hub assembly outer ring spigot from a radially inner side, as used in an existing vehicle;

FIG. 3C presents a schematic sectional view of a metal end cover matched to an outer ring spigot from a radially inner side, with glue used in a fitting region to improve the closure result, as used in an existing vehicle;

DETAILED DESCRIPTION OF THE PRESENT INVENTION

Figure 1:
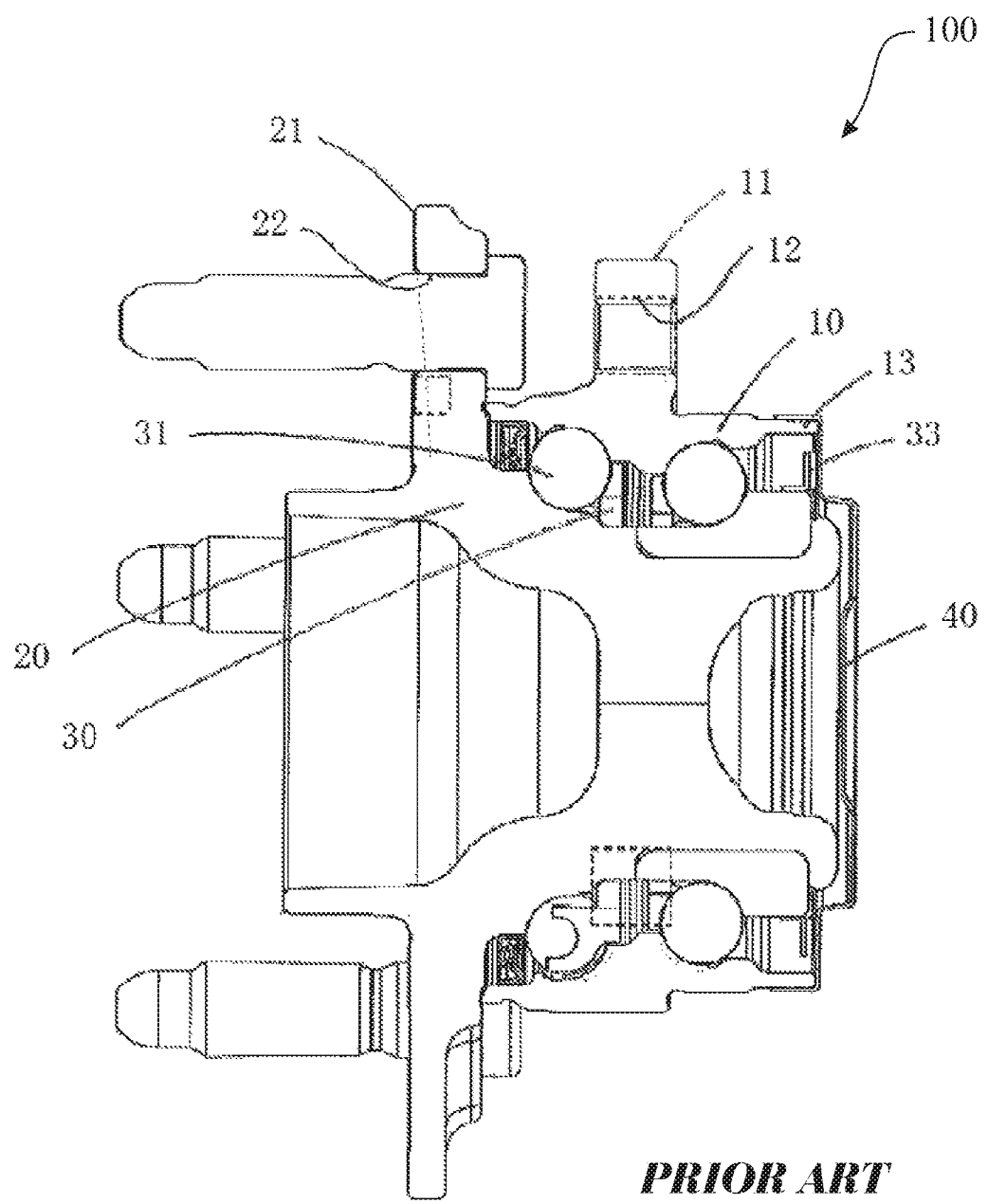
FIG. 1 presents a schematic sectional view of a non-driven wheel hub assembly used in an existing vehicle.

For convenience of description, the horizontal (i.e. left-right) direction in the drawings is defined as the "axial direction", and the vertical (i.e. up-down) direction perpendicular to the horizontal direction is defined as the "radial direction". In this text, the side of a vehicle hub unit 100 which faces a vehicle body, i.e. the right side in the figures, is defined as the "vehicle body inner side", and also the "axially inner side"; the side which faces a wheel, i.e. the left side in the figures, is defined as the "vehicle body outer side", and also the "axially outer side".

As stated in the background art section, the main problem with existing hub assembly products is that the end cover is largely made of a metal material such as austenitic stainless steel, which cannot easily form an airtight fit with a steel hub assembly outer ring spigot. For this reason, there is no option but to use filling materials such as rubber and glue to implement sealing and filling between the different metal components. This not only causes an increase in the cost of materials, but also complicates the fitting process. To solve these technical problems, the present invention largely employs a plastic end cover, which can achieve satisfactory airtight sealing with a metal spigot in the case of a fully tight fit, and is sufficient to prevent the ingress of water and various other impurities into the interior space of a hub assembly from the outside.

Even so, the compressive (permanent) deformation characteristics (compression set) of plastic materials make it difficult for these materials to maintain a tight fit with a metal member under the action of persistent stress; plastics readily lose elasticity after being deformed for a long time, and easily fall off the metal member, so cannot easily provide lasting and reliable protection for a hub assembly. In view of this, the present invention further provides a metal framework inside a plastic material, to provide lasting internal stress for an elastic region, and thereby ensure that the end cover is reliably and persistently fitted to the spigot of the bearing outer ring.

Figure 4:
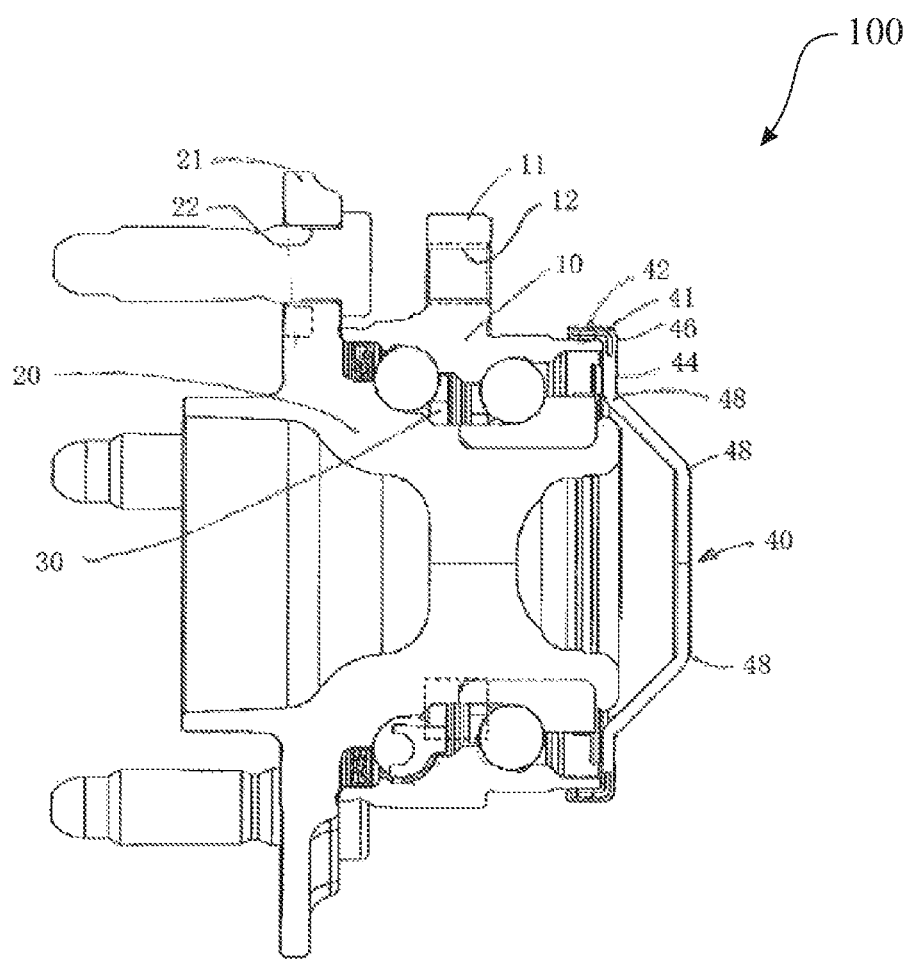
FIG. 4 presents a schematic sectional view of a vehicle hub assembly using the end cover in accordance with the present invention.
Figure 5:
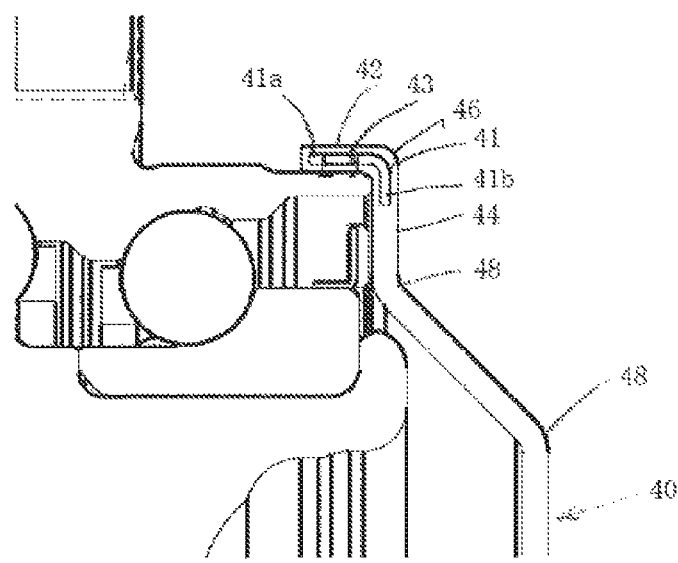
FIG. 5 presents a partial enlarged view of the end cover of the present invention employing a contained metal framework covered in a plastic material.

As shown in FIGS. 4 and 5, the end cover 40 is largely made of a plastic material, and is formed with a pressure fitting part 42 capable of being tightly fitted to a spigot 13 and with a radial main body part 44 capable of closing an interior space 30 of a hub assembly 100 from the axially inner side. The term "pressure fitting" as used here has a double meaning, on the one hand meaning that the pressure fitting part can be installed in place in one step by applying pressure axially during installation, and on the other hand meaning that after being fitted onto the spigot, the pressure fitting part 42 can persistently maintain due pressure.

The pressure fitting part 42 and the radial main body part 44 form an elastic retaining region 46 at a position where the two are joined; the elastic retaining region has a substantially L-shaped cross section, and contains a metal framework (metal insert) 41 which is substantially consistent with the elastic retaining region 46 in shape. Specifically, as shown in FIG. 5, the metal framework 41 has an axial extension part 41a extending axially and a radial extension part 41b extending radially. Theoretically, any metal framework 41 which is substantially bent in an L-shape can achieve the object of the present invention, but this does not prevent the metal framework from having other types of cross-sectional form, e.g. a C-shape. Optionally, the metal framework 41 is preferably made using an L-shaped pressed steel plate (steel stamping).

The metal framework 41 can not only be completely contained, i.e. completely covered in the plastic material, but can also be partially contained, i.e. with one side covered in the plastic material and another side exposed to the air. In the case of complete containment, there is no need to worry about the problem of metal rusting because the metal framework is not exposed; in the case of partial containment, since the metal framework is at least partially exposed (this is often done to simplify an injection molding process and reduce costs), there is a need to take steps to prevent rusting thereof, e.g. by applying an anti-corrosion coating.

As will be easily understood, in the case of partial containment, the side of the metal framework 41 facing the spigot 13 must be covered with plastic, in order to ensure airtight contact with the bearing spigot 13. If the hub assembly 100 is taken as a reference system, with the direction from outside to inside being defined as the "positive direction", and the direction from inside to outside being defined as the "negative direction", then experiments on air-tightness demonstrate that the pressures in the positive and negative directions which can be borne by the end cover 40 of the present invention after correct installation can reach a maximum of 0.5-0.6 MPa.

It can be seen from the description above that on the one hand, the metal framework 41 provides persistent elastic pressure for the elastic retaining region 46 of the end cover 40, avoiding detachment of the end cover due to permanent deformation of the plastic component, and ensuring that the end cover is persistently and reliably engaged on the spigot; on the other hand, in the case of a fully tight fit (e.g. an interference fit), the plastic material of the end cover can form an effective seal with the metal material of the outer ring spigot, preventing the ingress of water and mud/grit into the hub assembly from the outside.

As will be easily understood, the metal framework may be fully extended within the range shown in the figures, up to an axial extremity of the pressure fitting part 42, or exceed the range shown in the figures, being spread over the entire end cover in the radial direction, and thereby comprehensively increasing the elasticity and stress of the end cover. To ensure that the function of pressure fitting is realized, the length of extension of the metal framework in the axial and radial directions must be at least 3 times its own thickness.

In the embodiments shown in FIGS. 4 and 5, at least one fold region 48 is provided in an interior region of the radial main body part 44; the fold region may be formed to have an edge shape, or have a certain rounded curvature. Unlike the elastic retaining region 46 between the pressure fitting part 42 and the radial main body part 44, the fold region 48 located in a central region of the radial main body part 44 is not used to maintain stress of engagement with the spigot 13, but to increase the overall deformation capacity of the radial main body part 44, so as to facilitate installation of the end cover. The end cover having the fold region has full elasticity in the radial direction, can be fitted in place in just one step of press-fitting, is simple to operate, has controllable precision, and allows space for the bearing inner ring protruding towards the vehicle body inner side.

Figure 6:
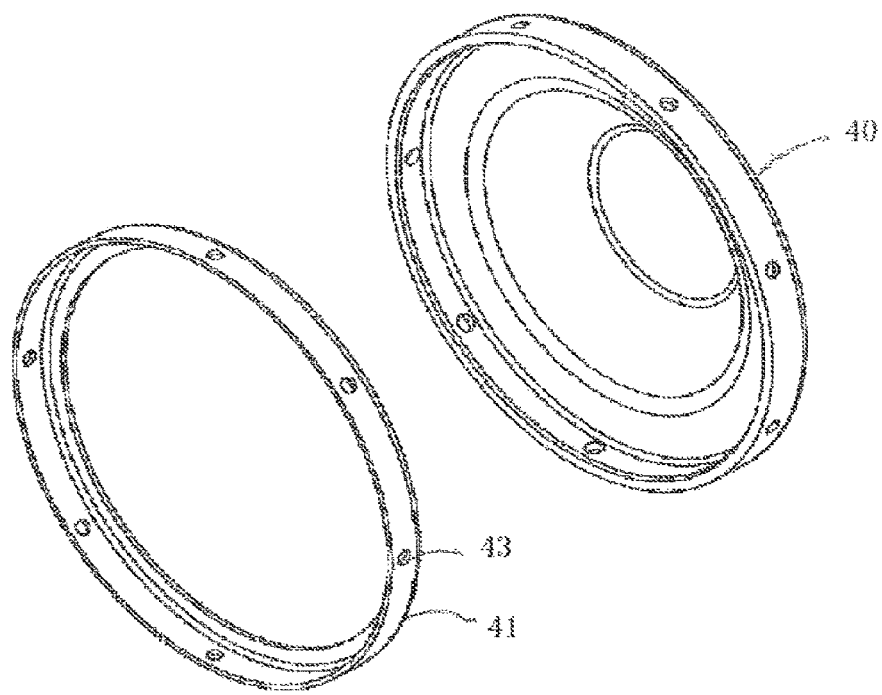
FIG. 6 presents a schematic exploded view of a contained metal framework and a peripheral plastic material of an end cover.
Figure 7:
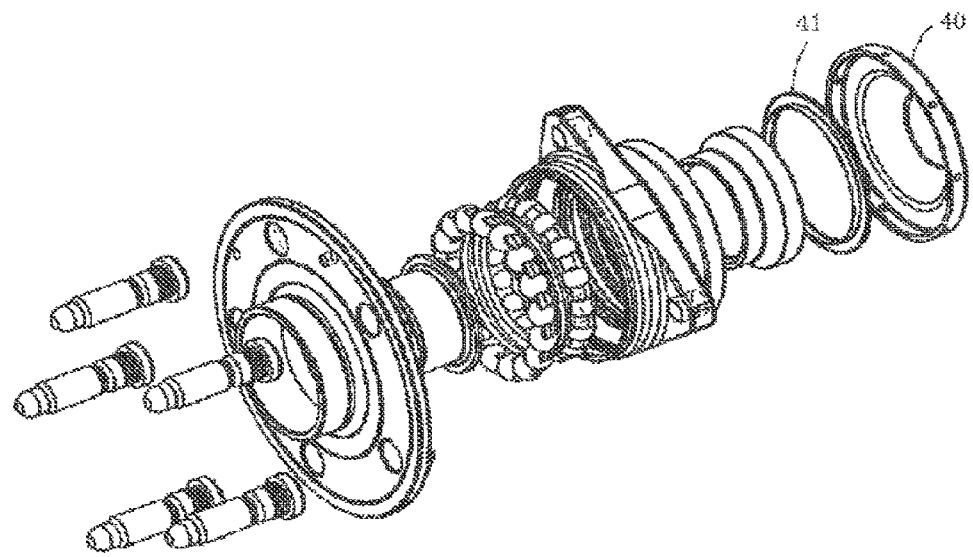
FIG. 7 presents a schematic three-dimensional exploded view of a vehicle hub assembly employing the end cover of the present invention.

In the embodiments shown in FIGS. 6 and 7, openings 43 are further provided on the metal framework 41. The openings 43 are provided not only in order to form a fit with cylindrical protrusions (not shown) formed in a plastic mould, so as to locate the metal framework in an injection molding mould, but also in order to allow molten plastic to enter the openings during injection molding, so as to form a physical connection between the cooled plastic material and the metal framework, preventing free rotation of the metal framework in the shaped plastic material. As will be easily understood, multiple openings distributed evenly along a circumference provide multiple connections between the plastic material and the metal framework, and are most conducive to the achievement of the abovementioned objectives.

It can be seen from the description above that when a contained metal framework is used at an elastic region in an end cover made largely of a plastic material, installation costs are reduced while reducing material costs, so the arrangement has huge practical significance and good application prospects.

Those skilled in the art should understand that any changes and improvements to the end cover described above and the hub assembly in which the end cover is used, as long as they are in conformity with the definitions in the attached claims, are included in the scope of protection of the present invention.

What is claimed is:

1. An end cover for providing closure and protection for a non-driven wheel hub assembly of a vehicle from a vehicle body inner side, the hub assembly comprising an outer ring, an inner ring, and two rows of rolling elements disposed between the outer ring and the inner ring, with the outer ring and the inner ring defining an interior space of the hub assembly in a radial direction, and the outer ring, at an end thereof facing the vehicle body inner side, forming a spigot for connection purposes,
the end cover comprising a pressure fitting part capable of being tightly fitted to the spigot from a radially outer side, and a radial main body part capable of closing the interior space of the hub assembly from an axial direction, with the pressure fitting part and the radial main body part forming an elastic retaining region at a junction there between;
wherein the end cover comprises a plastic material, and wherein one of (a) a completely contained metal framework or (b) a partially contained metal framework is formed at least in the elastic retaining region.

2. The end cover according to claim 1, wherein the elastic retaining region is formed to have a substantially L-shaped cross section, and contains a metal framework of consistent shape matching the elastic retaining region, the metal framework having an axial extension part extending axially and a radial extension part extending radially.

3. The end cover according to claim 2, wherein lengths of each of the axial extension part and the radial extension part in respective directions of the axial extension part and the radial extension part of the metal framework are at least 3 times the thickness of the metal framework.

4. The end cover according to claim 1, wherein an opening for fixing a plastic material is formed on the metal framework.

5. The end cover according to claim 1, wherein a plurality of openings for fixing a plastic material are formed on the metal framework,
wherein the openings are distributed evenly along a circumference of the metal framework.

6. The end cover according to claim 1, wherein the metal framework is partially enclosed in the plastic material of the end cover, with a side thereof facing the spigot being covered in a plastic material, and an exposed side being provided with a coating.

7. The end cover according to claim 1, wherein the plastic material of the end cover is fabricated of one of PA6 nylon plastic or of PA66 nylon plastic, and
wherein the metal framework is fabricated of a pressed steel plate.

8. The end cover according to claim 1 is integrated into a hub assembly of a vehicle nondriven wheel.

9. An end cover for providing closure and protection for a non-driven wheel hub assembly of a vehicle from a vehicle body inner side, the hub assembly comprising an outer ring, an inner ring, and two rows of rolling elements disposed between the outer ring and the inner ring, with the outer ring and the inner ring defining an interior space of the hub assembly in a radial direction, and the outer ring, at an end thereof facing the vehicle body inner side, forming a spigot for connection purposes,
the end cover comprising a pressure fitting part capable of being tightly fitted to the spigot from one of a radially inner side or a radially outer side, and a radial main body part capable of closing the interior space of the hub assembly from an axial direction, with the pressure fitting part and the radial main body part forming an elastic retaining region at a junction there between;
wherein the end cover comprises a plastic material, and wherein one of (a) a completely contained metal framework or (b) a partially contained metal framework is formed at least in the elastic retaining region; wherein at least one fold region is formed on the radial main body part in a radial direction and has a shape configured to increase the overall deformation capacity of the radial main body part, so as to facilitate installation of the end cover.

10. An end cover for providing closure and protection for a non-driven wheel hub assembly of a vehicle from a vehicle body inner side, the hub assembly comprising an outer ring, an inner ring, and two rows of rolling elements disposed between the outer ring and the inner ring, with the outer ring and the inner ring defining an interior space of the hub assembly in a radial direction, and the outer ring, at an end thereof facing the vehicle body inner side, forming a spigot for connection purposes,
the end cover comprising a pressure fitting part capable of being tightly fitted to the spigot from one of a radially inner side or a radially outer side, and a radial main body part capable of closing the interior space of the hub assembly from an axial direction, with the pressure fitting part and the radial main body part forming an elastic retaining region at a junction there between;

wherein the end cover comprises a plastic material, and wherein one of (a) a completely contained metal framework or (b) a partially contained metal framework is formed at least in the elastic retaining region; wherein the metal framework is completely enclosed in the plastic material of the end cover, and wherein no coating is provided on a metal surface.

* * * * *